United States Patent Office 2,999,564
Patented Sept. 12, 1961

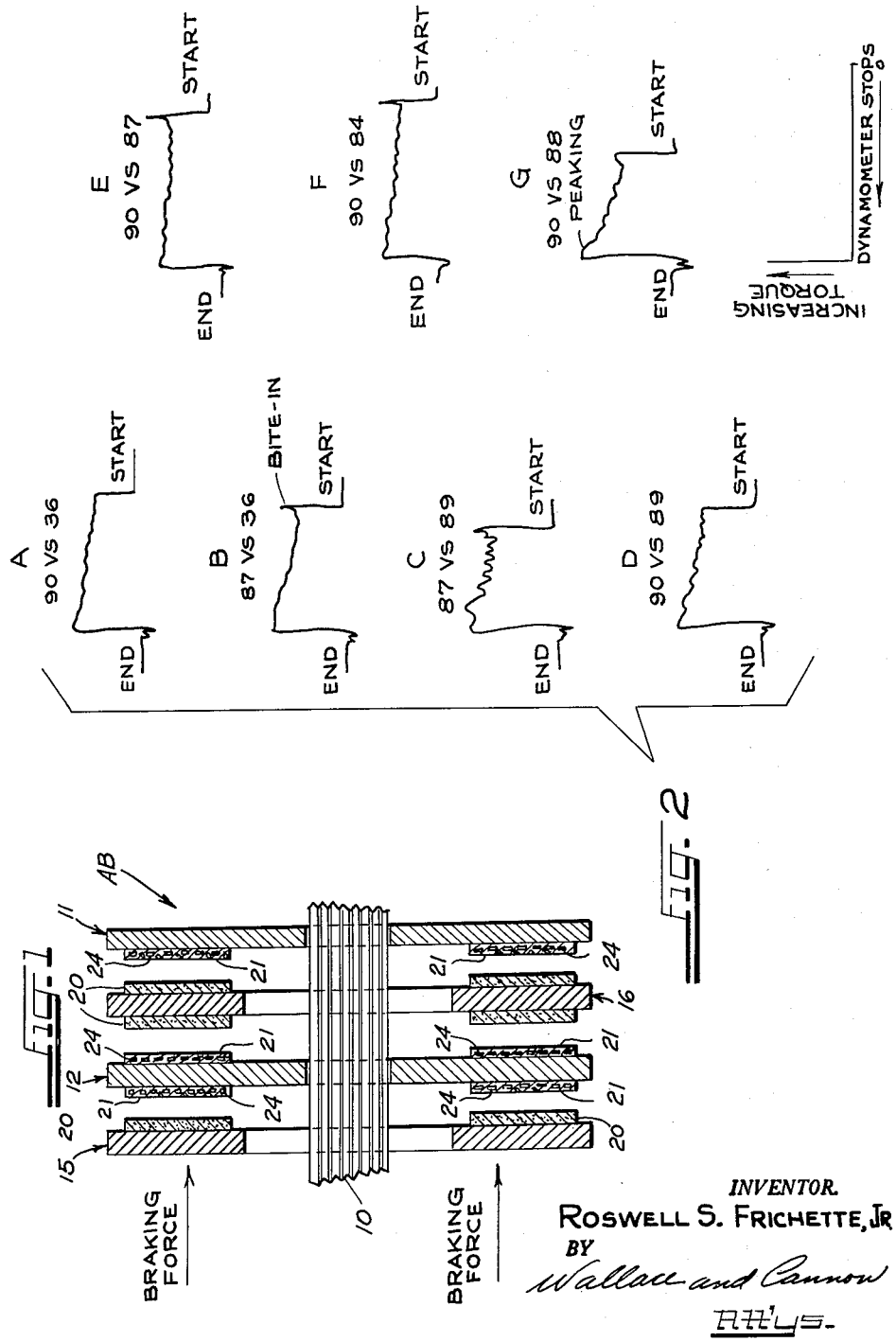

2,999,564
FRICTION COUPLES
Roswell S. Frichette, Jr., Ramsey, N.J., assignor to American Brake Shoe Company, New York, N.Y., a corporation of Delaware
Filed Aug. 26, 1959, Ser. No. 836,155
3 Claims. (Cl. 188—71)

This invention relates to friction couples and in particular to friction couples that are to be used in aircraft brake structure.

Heavy duty brake structure of the kind used in commercial and military aircraft today generally employ powdered metal friction elements as the expendable friction facings, and this is so for the reason that friction elements of powdered metal are capable of withstanding the high temperatures and tremendous high energy levels involved during the course of braking the landing aircraft.

Heretofore, one acceptable material for such friction elements has been a bronze base essentially of powdered copper and tin, but in view of advances in aircraft design and in particular the prospects of still even bigger aircraft, it has been recognized that bronze base materials will ultimately prove unacceptable. It has been proposed to overcome this problem by equipping friction couples of the foregoing kind with powdered metal facings essentially of properly bonded intermetallic compounds, and the present invention is primarily concerned with friction elements composed essentially of intermetallic compounds.

The proper design of a friction couple, particularly for aircraft brakes, involves numerous subtle factors. One of the most noteworthy among these is the attainment of proper torque characteristics, and in the circumstances involved torque values are a measure of the amount of twist exerted by the rotor member against the stator member in the friction couple. This twist, for the most advantageous operation, when measured on a dynamometer should show no sharp so-called "bite-in" at the beginning of friction couple engagement and should show no so-called "peaking" at the termination of engagement. During engagement the torque curve obtained from the dynamometer should be as smooth as possible demonstrating the lack of vibration or rough operation. These considerations are extremely important inasmuch as failure to conform to such desirable conditions results in gouging of the friction faces of the members in the friction couple, vibration, and undue strain on the brake struts.

In view of the foregoing, the primary object of the present invention is to so modify a friction couple from the standpoint of intermetallic friction facing materials as to eliminate undesirable torque conditions. Specifically, the object of the present invention is to face one of the members of a friction couple with a powdered metal friction element essentially of nickel-bonded nickel aluminide intermetallic and containing alumina, and to face the opposing member of the friction couple with material composed of nickel-bonded molybdenum aluminide and containing discrete pieces or chunks of commercially pure molybdenum metal. While the present invention has been introduced from the standpoint of considerations given to aircraft brakes, it will be appreciated that a friction couple of the kind contemplated can also be used to advantage as a heavy-duty clutch in heavy-duty industrial equipment and earth moving equipment.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a sectional view showing somewhat schematically a typical aircraft brake representing one form of friction couple in which the present invention is embodied; and FIG. 2 shows torque performances of materials tested in accordance with the present invention.

Based on dynamometer data to be discussed hereinafter, it has been found in accordance with the present invention that torque characteristics of friction couples faced with friction elements composed in part of intermetallic compounds are substantially improved by incorporating discrete pieces of molybdenum metal in the intermetallic material which affords the facing on one of the members of the friction couple. The molybdenum is advantageously in the form of pieces cut from commercially pure drawn molybdenum wire, and the pieces of molybdenum thus provided are mixed in with the powdered materials of which the corresponding facing is to be composed as the result of pressing and sintering the powders. During sintering and pressing, the nickel binder metal powders and the intermetallic compound particles weld one to another as a result of surface diffusion and become consolidated into a unitary matrix. The matrices respectively contain substantially physically and chemically unchanged and identifiable alumina particles on one hand and molybdenum metal chunks on the other hand, neither of which becomes part of its matrix. Thus, free molybdenum metal in the form of discrete chunks is dispersed in a matrix composed of powdered molybdenum aluminide sintered together in the presence of powdered nickel metal as a binder for the powdered molybdenum aluminide, and these discrete bodies are exposed and continue to be so in use. This is also true of the alumina particles in the other friction facing.

The other member of the friction couple is faced with a friction element composed of powdered nickel aluminide sintered with powdered nickel which again, as in the instance of molybdenum aluminide, bonds the intermetallic powders into a solid and dense body during the course of sintering and pressing. Advantageously, the friction element containing nickel aluminide also contains powdered alumina which is found to improve wear characteristics and to impart additional heat resistance.

The intermetallic compounds are obtained in the first instance by reacting the component metals in stoichiometric quantities and under conditions assuring purity of the resultant intermetallic compound, and the resultant intermetallic material is then granulated into the desired mesh size (—100 mesh to —325 mesh) typical of metal powders used in the formation of powdered metal friction elements. The intermetallic powders thus obtained are then mixed with the desired amount of powdered nickel metal of substantially the same mesh size, and, in the instance of the nickel aluminide, are also mixed with alumina. The alumina or equivalent hard, wear and heat resistant ceramic can vary from 60 to 200 mesh. In the instance of molybdenum aluminide, free molybdenum of relatvely large size is also mixed in, and the respective mixtures are pressed under simultaneous heat and pressure to produce densified solid bodies of the dimension and configuration determined as proper for the particular friction couple involved. Advantageously, the facings are in the form of buttons or arcuate segments such as 120° segments, and are secured to a disc-type backing member to complete construction of the rotor and stator of the friction couple as will be explained.

The following are examples of mixtures which respectively afford what can be designated the nickel aluminide alumina-containing facing (Example 1) and the molybdenum aluminide molybdenum-chunk-containing facing (Example 2). These, it should be mentioned, represent the materials deemed operative in achieving the results of the present invention as will be explained in detail hereinafter. Additional experiments and extrapolations demonstrate that the amount of molybdenum metal in chunk form in Example 2 can vary from about ten to fifty percent by weight of the entire mixture.

EXAMPLE 1

[For test part No. 36 hereinafter]

Material: Parts by weight
NiAl (−100 to −325 mesh) _____ 55
Ni (−100 to −325 mesh) _____ 25
$Al_2O_3$ (60 to 200 mesh) _____ 20

EXAMPLE 2

[For test part No. 90 hereinafter]

Material: Parts by weight
$Mo_3Al$ (−100 to −325 mesh) _____ 55
Ni (−100 to −325 mesh) _____ 25
Mo* _____ 20

* 0.008″ diam. wire in pieces 1/16″ to 3/8″ length corresponding to about 3 to 10 mesh size.

The materials of Examples 1 and 2 are mixed to a homogeneous state in separate batches, and measured amounts are then placed in respective graphite dies corresponding to the desired configuration of the ultimate sintered facings. Each mixture is then hot pressed in its die to the desired thickness (about ¼″ for example) under pressures of from 1000 to 5000 p.s.i. and at a temperature of from about 2200–3000° F. maintained for as long as 30 minutes. Conditions can be varied within the foregoing ranges depending upon the degree of consolidation and density desired for the facing. After completion of the hot press sinter operation, operative friction facings or elements are obtained, and these are then secured to respective stainless steel backing members to afford the stator and rotor members of the friction couple. Such securement can be by way of brazing or a mechanical interlock effected by riveting, or mounting the facings in flanged cups or channels in turn secured in any desired and effective manner to the backing member.

Referring to FIG. 1, there is illustrated an aircraft brake structure AB including a center shaft 10 which will rotate with the wheels of the aircraft during take-off and landing. The shaft 10 is splined, and rotor members 11 and 12 have toothed openings at the center thereof and are slipped onto the shaft 10 to be driven thereby. Alternately spaced among the rotors are stator members as 15 and 16, and as indicated by legend in FIG. 1 a braking force will be exerted on an outer one of the stators to produce engagement of the facings on the members of the friction couple. The means by which the stators are guided and supported are not shown.

The stators include suitable metal plates of disc form faced with friction elements 20 composed in accordance with Example 1, and the rotors include suitable metal plates of disc form faced with friction elements 21 composed in accordance with Example 2 and containing pieces of molybdenum wire 24 in accordance with the present invention. The molybdenum wire pieces 24 are uniformly spaced and distributed and will be presented continuously to the opposed facings 20 during engagement of the stator and rotor faces. As will be explained in detail below, the incorporation of molybdenum wire in the friction facings 21 accounts for efficient torque characteristics.

Variations of Examples 1 and 2 were made in testing combinations which ultimately lead to the combination of materials under the present invention and represented by Examples 1 and 2. The combinations tested are listed hereinafter in Table I, and performance characteristics from the standpoint of torque are shown in FIG. 2, which is a group of curves depicting exactly those obtained from actual dynamometer tests.

Table I
COMBINATIONS TESTED

| Part No. | Stator Material | Rotor Part No. | Rotor Material |
|---|---|---|---|
| 36 | 55NiAl-25Ni-20Al₂O₃ __ vs __ | 90 | 55Mo₃Al-25Ni-20Mo wire. |
| 36 | 55NiAl-25Ni-20Al₂O₃ __ vs __ | 87 | 55Mo₃Al-25Mo-20Al₂O₃. |
| 89 | 55NiAl-25Ni-20 Mo wire __ vs __ | 87 | 55Mo₃Al-25Mo-20Al₂O₃. |
| 89 | 55NiAl-25Ni-20 Mo wire __ vs __ | 90 | 55Mo₃Al-25Ni-20 Mo wire. |
| 87 | 55Mo₃Al-25Mo-20Al₂O₃ __ vs __ | 90 | 55Mo₃Al-25Ni-20 Mo wire. |
| 84 | 75 NiAl-25Ni __ vs __ | 90 | 55Mo₃Al-25Ni-20 Mo wire. |
| 88 | 50NiAl-50Ni __ vs __ | 90 | 55Mo₃Al-25Ni-20 Mo wire. |

Referring to FIG. 2B the combination 87 (rotor) against 36 (stator) is unsatisfactory because of the sharp bite-in at the commencement of friction couple engagement evidenced by the sharp "pip" on the torque curve obtained from the dynamometer instruments. This manifests a gouging action on the friction elements, and is also found to be present in the combination 90—87 (FIG. 2E) and the combination 90—84 (FIG. 2F). The combinations 87—89 and 89—90 were found to be unsatisfactory because of excessive wear of the friction elements (molybdenum metal in nickel aluminide) and also because of significant torque vibration as will be evident from the rough dynamometer curves in FIG. 2C and FIG. 2D.

Referring to FIG. 2G (the combination 90—88) it will be observed that a rather significant rise ("peaking") in torque was encountered toward the end of engagement and bite-in was encountered at the beginning. On the other hand, combination 90—36, FIG. 2A, showed no pip or bite-in at the commencement of engagement. Moreover, there was no peaking at the end of the engagement, and there was no unsatisfactory vibration during the course of engagement.

It will be seen from the foregoing that the incorporation of discrete chunks of molybdenum metal in a friction element composed essentially of nickel-bonded molybdenum aluminide, and acting in opposition to a friction element essentially of nickel-bonded nickel aluminide, accounts for smooth torque performance. This is important in eliminating vibration, gouging of one of the friction elements, and undue stressing of related parts of the friction couple during engagement. These satisfactory results are not achieved by having molybdenum aluminide in both facings (combination 87—90), nor by incorporating the chunks of molybdenum metal in both friction facings (combination 89—90). Nor are satisfactory results achieved in the absence of the chunks of molybdenum wire as will be evident from FIG. 2B.

It should be mentioned that so long as the operative combination of Examples 1 and 2 is utilized, it is immaterial whether the corresponding friction facings or elements be on the stator or rotor. It will be realized that the form of molybdenum metal used in the present instance merely represents a relatively inexpensive commercial form of molybdenum readily obtainable, and hence other forms of large particle size molybdenum can be used.

Hence, while I have illustrated and described a preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A friction couple comprising a rotary member and an opposing member, engageable one with another, one of said members being faced with a powdered metal friction element composed of nickel aluminide intermetallic bonded by and sintered with nickel metal, and containing a hard ceramic imparting enhanced wear and thermal resistance thereto, and the other of said members being faced with a powdered metal element composed of molybdenum aluminide intermetallic bonded with nickel metal and containing discrete chunks of molybdenum metal dispersed in the nickel bonded molybdenum aluminide, said facings being disposed opposite one another in the friction couple.

2. A friction couple comprising a rotary member and an opposing member engageable one with another, one of said members being a metal plate faced with a powdered metal friction element composed of nickel aluminide intermetallic bonded by and sintered with nickel metal and containing alumina as a hard ceramic imparting enhanced wear and thermal resistance thereto, and the other of said members being a metal plate faced with a powdered metal element composed of molybdenum aluminide intermetallic bonded by and sintered with nickel metal and containing discrete chunks of molybdenum metal dispersed in the nickel bonded molybdenum aluminide, said facings being disposed opposite one another in the friction couple.

3. A friction couple comprising a rotary member and an opposing member engageable one with another, one of said members being a ferrous metal plate faced with a powdered metal friction element composed essentially of nickel aluminide intermetallic bonded by nickel metal and containing alumina as a hard ceramic imparting enhanced wear and thermal resistance thereto, and the other of said members being a ferrous metal plate faced with a powdered metal element composed essentially of molybdenum aluminide intermetallic bonded with nickel metal and containing about ten to fifty percent by weight of discrete chunks of molybdenum metal of about 3 to 10 mesh size dispersed in the nickel bonded molybdenum aluminide, said facings being disposed opposite one another in the friction couple.

References Cited in the file of this patent

UNITED STATES PATENTS 2,784,105     Stedman et al. _____ Mar. 5, 1957

FOREIGN PATENTS 769,212     Great Britain _____ Mar. 6, 1957